(No Model.)
L. S. HAGAN.
FRUIT PICKER.
No. 605,419. Patented June 7, 1898.
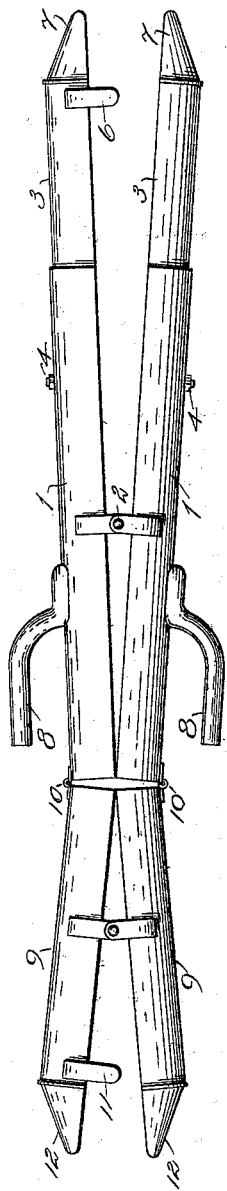
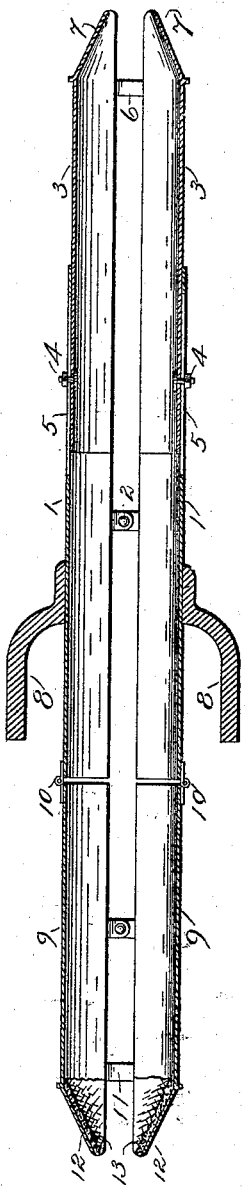
WITNESSES
INVENTOR
Leo. S. Hagan,
By John Wedderburn.
Attorney

UNITED STATES PATENT OFFICE.

LEO SENEARS HAGAN, OF BREWER, MISSOURI.

FRUIT-PICKER.

SPECIFICATION forming part of Letters Patent No. 605,419, dated June 7, 1898.

Application filed June 10, 1897. Serial No. 640,208. (No model.)

*To all whom it may concern:*

Be it known that I, LEO SENEARS HAGAN, of Brewer, in the county of Perry and State of Missouri, have invented certain new and useful Improvements in Fruit-Pickers; and I do hereby declare the following to be a full, clear, and exact description of the invention, such as will enable others skilled in the art to which it appertains to make and use the same.

This invention relates to fruit-pickers, and has for its object to provide an improved form of fruit-picker which is telescopic and capable of being used under any circumstances without danger of becoming entangled in the branches.

To this end my invention consists of certain novel features of construction and combination of parts illustrated in the accompanying drawings and hereinafter fully described in the specification.

Figure 1 is a view of my fruit-picker open to receive a fruit, and Fig. 2 is a sectional view of the picker.

The numeral 1 indicates the sides of my picker, which are pivotally joined, as at 2. Telescoping extensions 3 are held within the sides by means of the bolts and nuts 4, moving within the slots 5. Guide-pieces 6 are attached to one of these telescopic pieces at the upper end, and fingers 7 extend upward from the telescoping pieces. Handles 8 are securely fastened at the lower end of the body of my device. The delivery-tube comprises two pivotally-connected sides 9, each of which is joined by a spring 10 to one of the sides of my main tube. Guide-pieces 11 are provided in the lower end of the delivery-tube and are similarly shaped to those upon the upper end of the telescoping tubes. An extended portion 12, similar to the fingers upon the upper end of the telescoping tubes, is provided upon the lower end of the delivery-tube, and a cushion of some soft material 13 is held therein.

The operation of my device is exceedingly simple. Having adjusted the same by means of the bolts to the required length, the upper ends are opened by pushing the handles together. It is then passed over a fruit and closed by pulling the handles apart. A gentle pull now serves to detach the fruit from the tree, and it falls down the tube, striking on the cushion at the bottom of the delivery-tube. It is intended that the operator shall have a bag, basket, or box strapped over his shoulders, into which the end of the delivery-tube may extend. The fruit is held within the delivery-tube until a second fruit is picked, when the action of opening the jaws to place the same over the second fruit permits the first fruit to fall out into the receptacle, and as this fall is but a few inches it obviates the possibility of the fruit being bruised in any manner.

It is obvious that many minor changes could be made without departing from the principles of my device. I do not, therefore, desire to confine myself to the exact construction and arrangement herein shown, but wish to include all forms that may properly come within the scope of my claims.

Having thus described my invention, what I claim as new, and desire to secure by Letters Patent, is—

1. A fruit-picker comprising a body portion made up of two sections substantially semicircular in cross-section, pivoted one to the other at points intermediate of their ends and provided with picking-fingers, and a delivery-tube made up of two sections substantially semicircular in cross-section, pivoted one to the other intermediate of their ends and pivoted respectively to the sections of the body portion, as and for the purpose set forth.

2. A fruit-picker comprising a body portion made up of two sections substantially semicircular in cross-section, pivoted one to the other at points intermediate of their ends, provided with picking-fingers, guides on said sections for holding them in alinement one with the other, a handle for operating said sections, and a delivery-tube made up of two sections, substantially semicircular in cross-section, pivoted to each other at a point intermediate of their ends and pivoted respectively to the sections of the body portion, as and for the purpose set forth.

3. A fruit-picker comprising a body portion made up of two sections substantially semicircular in cross-section pivoted together at points intermediate of their ends, provided with picking-fingers at one end and with handles at their opposite ends, and a delivery-tube made up of two sections substantially semicircular in cross-section pivoted one to the other at points intermediate of their ends, and having their lower ends contracted and pivoted at their opposite ends respectively to the sections of the body portion.

4. In a fruit-picker, the combination with tubular pivoted sides, of telescopic extensions thereto, held within said sides, guide-pieces on said extensions, clipping-fingers on the ends thereof, means for adjusting said extensions within said tubular sides, handles upon said sides, a delivery-tube comprising two sides approximately semicircular in cross-section pivoted together, flexible springs each joining one of said sides to one side of the telescopic body portion, guide-pieces carried on one of said sides and an extension thereon provided with cushioning material, substantially as shown and for the purpose set forth.

In testimony whereof I have signed this specification in the presence of two subscribing witnesses.

LEO SENEARS HAGAN.

Witnesses:
    WM. M. LAYTON,
    THOMAS NASH.